(12) United States Patent
Zhang

(10) Patent No.: US 11,121,862 B2
(45) Date of Patent: Sep. 14, 2021

(54) SYSTEM AND METHOD FOR WIRELESS NETWORK ACCESS PROTECTION AND SECURITY ARCHITECTURE

(71) Applicant: Huawei Technologies Co., Ltd., Shenzhen (CN)

(72) Inventor: Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/704,410

(22) Filed: Dec. 5, 2019

(65) Prior Publication Data

US 2020/0112428 A1    Apr. 9, 2020

Related U.S. Application Data

(63) Continuation of application No. 16/249,232, filed on Jan. 16, 2019, now Pat. No. 10,530,573, which is a
(Continued)

(51) Int. Cl.
*H04W 12/04* (2021.01)
*H04L 9/08* (2006.01)
(Continued)

(52) U.S. Cl.
CPC ............... *H04L 9/08* (2013.01); *H04W 4/70* (2018.02); *H04W 12/02* (2013.01);
(Continued)

(58) Field of Classification Search
CPC ......... H04L 63/04; H04L 63/08; H04L 63/06; H04L 63/061; H04L 9/08; H04L 9/0822;
(Continued)

(56) References Cited

U.S. PATENT DOCUMENTS 6,097,817 A     8/2000  Bilgic et al.
6,453,159 B1 *  9/2002  Lewis ................... H04W 12/03
                                                          455/411

(Continued)

FOREIGN PATENT DOCUMENTS

CN        1946233 A      4/2007
CN      101810017 A      8/2010
(Continued)

*Primary Examiner* — Kristine L Kincaid
*Assistant Examiner* — Shaqueal D Wade
(74) *Attorney, Agent, or Firm* — Slater Matsil, LLP

(57) ABSTRACT

Wireless network specific (WN-specific) key can be used to provide access protection over the radio access link. A WN-specific key may be associated with (or assigned to) a wireless network, and distributed to access points of the wireless network, as well as to user equipments (UEs) following UE authentication. The WN-specific key is then used to encrypt/decrypt data transported over the radio access link. The WN-specific key can be used in conjunction with the UE-specific keys to provide multi-level access protection. In some embodiments, WN-specific kays are shared between neighboring wireless networks to reduce the frequency of key exchanges during handovers. Service-specific keys may be used to provide access protection to
(Continued)

machine to machine (M2M) services. Group-specific keys may be used to provide access protection to traffic communicated between members of a private social network.

20 Claims, 10 Drawing Sheets

Related U.S. Application Data continuation of application No. 14/790,743, filed on Jul. 2, 2015, now Pat. No. 10,212,585.

(60) Provisional application No. 62/020,593, filed on Jul. 3, 2014.

(51) Int. Cl.
| | |
|---|---|
| *H04W 4/70* | (2018.01) |
| *H04W 12/033* | (2021.01) |
| *H04W 12/02* | (2009.01) |
| *H04W 12/06* | (2021.01) |
| *H04L 29/06* | (2006.01) |
| *H04W 12/08* | (2021.01) |

(52) U.S. Cl.
CPC ......... *H04W 12/033* (2021.01); *H04W 12/04* (2013.01); *H04L 63/04* (2013.01); *H04L 63/08* (2013.01); *H04W 12/06* (2013.01); *H04W 12/08* (2013.01)

(58) Field of Classification Search
CPC ... H04L 9/0819; H04L 9/0861; H04L 9/0838; H04W 12/02; H04W 12/04; H04W 12/06; H04W 12/03; H04W 12/037; H04W 12/033

See application file for complete search history.

(56) References Cited

U.S. PATENT DOCUMENTS

| | | | |
|---|---|---|---|
| 7,561,694 B1* | 7/2009 | Chakrabarti | H04L 9/0822 380/270 |
| 8,042,033 B2 | 10/2011 | Karmanenko et al. | |
| 8,453,052 B1 | 5/2013 | Newman et al. | |
| 8,705,738 B2 | 4/2014 | Grayson et al. | |
| 8,769,611 B2 | 7/2014 | Narayanan et al. | |
| 9,332,428 B2 | 5/2016 | Kruegel et al. | |
| 2002/0191572 A1* | 12/2002 | Weinstein | H04W 12/0609 370/338 |
| 2007/0043940 A1 | 2/2007 | Gustave et al. | |
| 2008/0065548 A1 | 3/2008 | Muijen | |
| 2008/0181404 A1 | 7/2008 | Matsuki et al. | |
| 2009/0086971 A1 | 4/2009 | Grayson et al. | |
| 2009/0323937 A1* | 12/2009 | Teng | H04L 9/0891 380/36 |
| 2010/0115628 A1 | 5/2010 | Li et al. | |
| 2011/0069836 A1 | 3/2011 | Rae et al. | |
| 2011/0112969 A1 | 5/2011 | Zaid et al. | |
| 2011/0294435 A1 | 12/2011 | Miller et al. | |
| 2012/0144462 A1* | 6/2012 | Pochop, Jr. | H04L 63/062 726/6 |
| 2013/0136064 A1* | 5/2013 | Jamadagni | H04L 69/03 370/328 |
| 2013/0301611 A1 | 11/2013 | Baghel et al. | |
| 2013/0336486 A1* | 12/2013 | Agiwal | H04W 12/0401 380/270 |
| 2016/0191471 A1 | 6/2016 | Ryoo et al. | |

FOREIGN PATENT DOCUMENTS

| | | |
|---|---|---|
| CN | 102667655 A | 9/2012 |
| EP | 1758310 A1 | 2/2007 |

* cited by examiner

SYSTEM AND METHOD FOR WIRELESS NETWORK ACCESS PROTECTION AND SECURITY ARCHITECTURE

This application is a continuation of U.S. patent application Ser. No. 16/249,232 filed on Jan. 16, 2019 and entitled "System and Method for Wireless Network Access Protection and Security Architecture," which is a continuation of U.S. patent application Ser. No. 14/790,743 filed on Jul. 2, 2015 and entitled "System and Method for Wireless Network Access Protection and Security Architecture," which claims priority to U.S. Provisional Application No. 62/020,593 filed on Jul. 3, 2014 and entitled "System and Method for Wireless Network Access Protection and Security Architecture," which applications are hereby incorporated by reference herein as if reproduced in their entireties.

TECHNICAL FIELD

The present invention relates to a system and method for wireless communications, and, in particular embodiments, to a system and method for wireless network access protection and security architecture.

BACKGROUND

Wireless networks often use access keys to ensure that only valid subscribers are permitted to access the wireless network. In conventional 3G/4G wireless networks, user equipment (UE) specific key materials are distributed to packet data network (PDN) gateways (PGW) in the evolved packet core (EPC) and user equipments (UEs) by a mobility management entity (MME) after UE authentication/authorization, and are used to encrypt data communications over the bearer channel extending between the UE and the PGW. Notably, the UE-specific key materials, or UE-specific keys (for short), are transferred between wireless network during handovers. This transferring of UE-specific keys may be problematic in densely deployed environments, where handovers are more frequent, as repeatedly transferring key materials between wireless networks significantly increases the latency and overhead associated with UE mobility. Accordingly, techniques for quickly, and efficiently authenticating UEs in densely deployed environments are desired.

SUMMARY OF THE INVENTION

Technical advantages are generally achieved, by embodiments of this disclosure which describe "wireless network access protection and security architecture."

In accordance with an embodiment, a method for wireless network access protection is provided. In this example, the method comprises obtaining a wireless network (WN) specific key assigned to a wireless network by a base station. The base station belongs to the wireless network. The method further includes establishing a wireless connection between the base station and a user equipment (UE), and receiving encrypted data from the UE over the wireless connection. The encrypted data has first and second layers of encryption. The method further includes decrypting the first layer of encryption using the WN specific key to obtain partially decrypted data, and forwarding the partially decrypted data to a gateway in the WN. An apparatus for performing this method is also provided.

In accordance with another embodiment, a method for distributing keys in wireless networks is provided. In this example, the method comprises generating a wireless network (WN) specific key at a WN key controller. The WN specific key is assigned to a first wireless network. The method further includes distributing the WN specific key to base stations in the first wireless network to provide access protection over radio access interfaces established between the base stations and user equipments (UEs) accessing the wireless network. An apparatus for performing this method is also provided.

In accordance with yet another embodiment, a key management architecture is provided. In this example, the key management architecture includes a wireless network (WN) protection controller adapted to obtain user equipment (UE) specific keys assigned to the UEs accessing a wireless network, and to distribute the UE specific keys to a serving gateway (SGW) in the wireless network. The UE specific keys are adapted to provide access protection over bearer channels extending between the UE and the SGW.

In accordance with yet another embodiment, a method for authenticating a mobile device is provided. In this example, the method includes receiving a UE specific key at a WN protection controller assigned to distribute keys throughout a wireless network. The method further includes identifying a wireless network domain that corresponds to a UE identifier specified by the UE specific key, and distributing the UE specific key to a serving gateway (SGW) in the wireless network domain. The UE specific key is adapted to provide access protection to a bearer channel extending between the UE and the SGW. An apparatus for performing this method is also provided.

In accordance with yet another embodiment, a method for providing service specific access protection is provided. In this example, the method includes identifying a machine-to-machine (M2M) service associated with an M2M customer, receiving a service-specific key assigned to the M2M service at an SGW, and receiving a packet from a network device. The packet is related to the M2M service. The method further includes attempting to decrypt the packet using the service-specific key, and dropping the packet when the attempt to decrypt the packet is unsuccessful. An apparatus for performing this method is also provided.

In accordance with yet another embodiment, a method for group specific access protection is provided. In this example, method comprises identifying a private network, receiving a group-specific key assigned to the private network at an SGW, receiving a packet addressed to a network device belonging to the private network, and attempting to decrypt the packet using the group-specific key. The method further comprises dropping the packet when the attempt to decrypt the packet is unsuccessful. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

3G/4G wireless networks use UE-specific keys to provide access protection to bearer channels extending from the UEs to a packet data network (PDN) gateway (PGW) in the evolved packet core (EPC) network. However, they do not provide a separate level of access protection for the wireless connection extending between the UE and RAN. In future network architectures, a Radio Access Network may have infrastructure provided by a first entity, and telecommunications services provided atop that infrastructure by another entity. To accommodate increasing demand for bandwidth, it is likely that future network deployments will include both dense and ultradense network segments as part of the overall network. Accordingly, a multi-level access network security framework that is suitable for densely deployed wireless networks is desired.

Aspects of this disclosure provide techniques for utilizing wireless network specific (WN-specific) key materials, or WN-specific keys (for short), in order to provide access protection over the radio access link. More specifically, a WN-specific key is associated with (or assigned to) a wireless network, and distributed to access points of the wireless network, as well as to UEs upon UE authentication. The WN-specific key is then used to encrypt/decrypt data transported over the radio access link. The WN-specific key can be used in conjunction with the UE-specific keys to provide multi-level access protection. In some embodiments, WN-specific keys are shared between neighboring wireless networks to reduce the frequency of key exchanges during handovers. For example, a common WN-specific key may be pre-distributed to access points in neighboring wireless networks to allow handovers to take place between those neighboring wireless networks without exchanging the WN-specific key during the handover. Aspects of this disclosure also provide service-specific keys for providing access protection to machine to machine (M2M) services, as well as group-specific keys for providing access protection to traffic communicated between members of a common group, e.g., a private social network, etc. Network security architectures for distributing UE-specific, WN-specific, service-specific, and group-specific keys are also provided. These and other details are explained in greater detail below.

Figure 1:
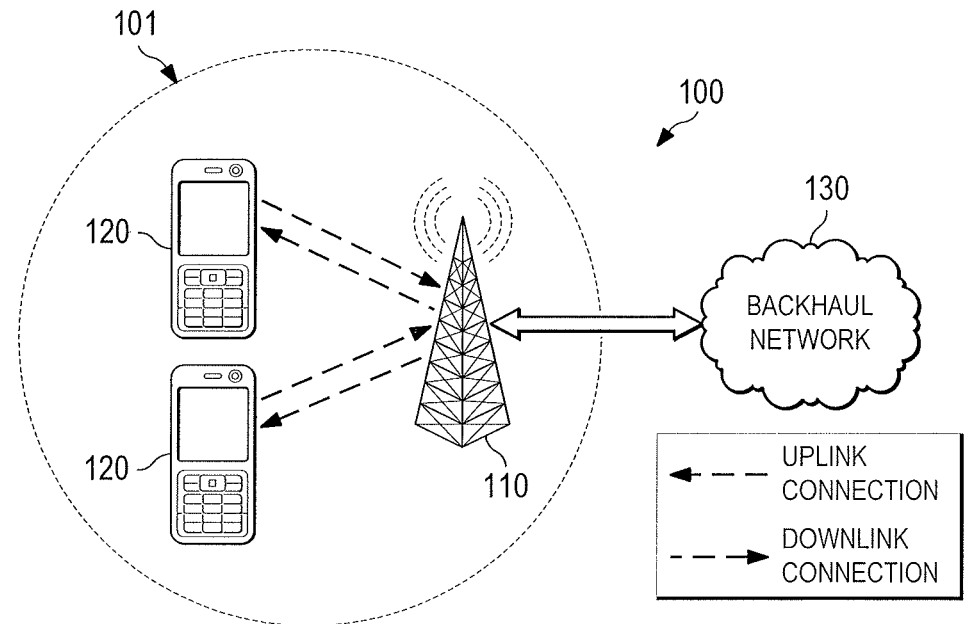
FIG. 1 illustrates a diagram of an embodiment wireless network.

FIG. 1 illustrates a network 100 for communicating data. The network 100 comprises an access point (AP) 110 having a coverage area 101, a plurality of mobile devices 120, and a backhaul network 130. The AP 110 may comprise any component capable of providing wireless access by, inter alia, establishing uplink (dashed line) and/or downlink (dotted line) connections with the mobile devices 120, such as a base station, an enhanced base station (eNB), a femtocell, and other wirelessly enabled devices. The mobile devices 120 may comprise any component capable of establishing a wireless connection with the AP 110, such as a user equipment (UE), a mobile station (STA), or other wirelessly enabled devices. The backhaul network 130 may be any component or collection of components that allow data to be exchanged between the AP 110 and a remote end (not shown). In some embodiments, the network 100 may comprise various other wireless devices, such as relays, low power nodes, etc.

Figure 2:
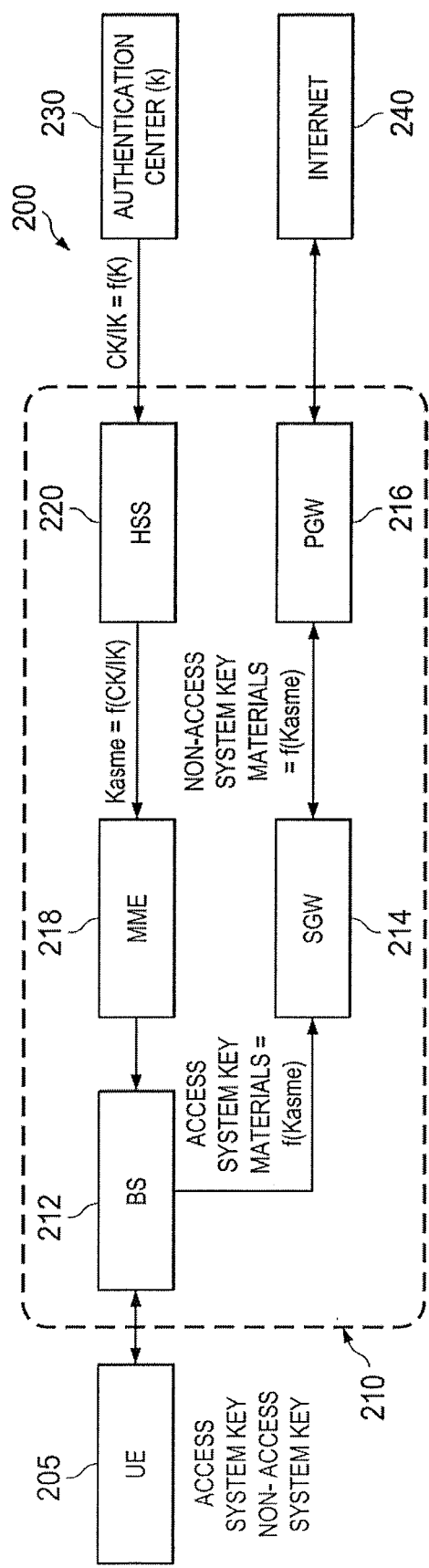
FIG. 2 illustrates a diagram of a conventional wireless network security architecture.

Conventional 3G/4G wireless networks use UE-specific keys to provide access protection to bearer channels extending from the UEs to the PGW in the EPC network, but do not provide a separate level of access protection for the wireless connection extending between the UE and RAN. FIG. 2 illustrates a conventional wireless network security architecture 200 that provides a single layer of access protection. As shown, the conventional wireless network security architecture 200 comprises wireless network domain 210 that provides wireless access to a UE 205. The wireless network domain 210 comprises a base station 212, an SGW 214, a PGW 216, a mobility management entity (MME) 218, and a home security server (HHS) 220. A bearer channel is established between the UE 205 and the PGW 216 through the BS 212 and the SGW 214. The PGW 216 acts as a gateway between the wireless network domain 210 and the interne 240.

The UE 205 is authenticated by the MME 218 when establishing the bearer channel. Specifically, the authentication center 230 generates a shared key (e.g., a common secret key access security management entity (KASME)) using a ciphering key (CK) and an integrity key (IK) during UE authentication. The authentication center 230 then generates a set of keys and checksums using the shared key and a random number, and sends the generated keys, checksums, and random number to the MME 218. The MME 218 distributes the generated checksums and the random number to the UE 205. A universal subscriber identity module (USIM) within the UE 205 independently computes the same set of keys using the random number and the shared key provided by the MME 218. Mutual authentication is executed by verifying the computed checksums in the UE 205 and the EPC 218. Thereafter, the MME 218 distributes a UE-specific key to both the UE 205 and the PGW 216. The UE specific key is used to encrypt/decrypt data communicated over the bearer channel. For example, the UE 205 may use the UE-specific key to encrypt data carried in uplink transmissions over the bearer channel, and the PGW 216 may use the UE-specific key to attempt to decrypt data received over the bearer channel. Once the data is decrypted, the PGW 216 may forward the data over the internet 240 to a remote destination. In some embodiments, the MME 218 sends public-private key pairs to the UE 205 and the PGW 216. The UE 205 and the PGW 216 may use the public-private key pairs to generate a UE-specific key. For example, the UE 205 may unilaterally generate a UE-specific key, encrypt the UE specific key using the public-private key pairs, and then communicate the encrypted UE-specific key to the PGW 216. As another example, the PGW 216 may unilaterally generate a UE-specific key, encrypt the UE specific key using the public-private key pairs, and then communicate the encrypted UE-specific key to the UE 205. As yet another example, the PGW 216 and the UE 205 may bilaterally generate a UE-specific key through, for example, a key exchange protocol, and the messages exchanged during the key exchange protocol may be encrypted using the public-private key pairs.

While the UE-specific key may provide access protection to the bearer channel extending between the UE and the PGW, it does not provide protection to the wireless connection extending between the UE and the BS. Accordingly, a multi-level access network security framework that is suitable for densely deployed wireless networks is desired.

Figure 3:
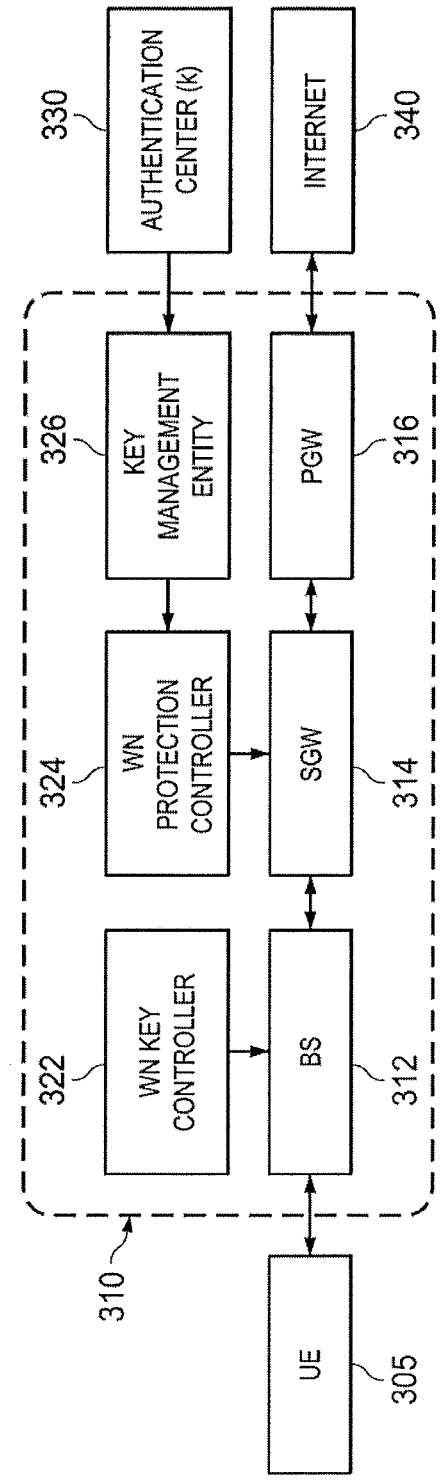
FIG. 3 illustrates a diagram of an embodiment wireless network security architecture.

Aspects of this disclosure provide a multi-layer access protection scheme that provides access protection to radio access links using a WN-specific key, in addition to providing access protection to the bearer channel using the UE-specific key. FIG. 3 illustrates an embodiment wireless network security architecture 300 for providing multi-level access protection. As shown, the embodiment wireless network security architecture 300 comprises a wireless network domain 310 that provides wireless access to a UE 305. The wireless network domain 310 comprises a base station 312 (also referred to as access point 312), a serving gateway 314, a packet gateway 316, a WN key controller 322, a WN protection controller 324, and a key management entity 326.

A UE-specific key is used to encrypt/decrypt data communicated over a bearer channel extending between the UE 305 and the serving gateway 314. The serving gateway 314 may be a virtual serving gateway, such as a virtual user-specific serving gateway or a virtual service specific serving gateway. The UE-specific key may be distributed to the serving gateway 314 via the WN protection controller 324, which may obtain the UE-specific key from the key management entity 326. In an embodiment, the key management entity 326 is a third party management entity operated by a third party administrator that is separate and distinct form an operator of the wireless network. The key management entity 326 may derive the UE-specific key using information provided the authentication center 330. The WN protection controller 324 may have various responsibilities. For example, the WN protection controller 324 may maintain key materials, e.g., UE-specific keys, service-specific keys, group-specific keys, backhaul (BH) keys, etc. The WN protection controller 324 may also manage network-node/device authorization, and coordinate the synchronization of keys with other controller in other wireless network domains.

A WN-specific key is used to encrypt/decrypt data communicated over a wireless connection extending between the UE 305 and access point 312. The WN-specific key may be distributed to the access point 312 prior to UE 305 establishing a radio link connection. The WN-specific key may be sent to UE 305 following UE authentication. The WN-specific key may be assigned exclusively to the wireless network domain 310. Alternatively, the WN-specific key may be assigned to a group or cluster of wireless network domains to which the wireless network domain 310 belongs.

Figure 4:
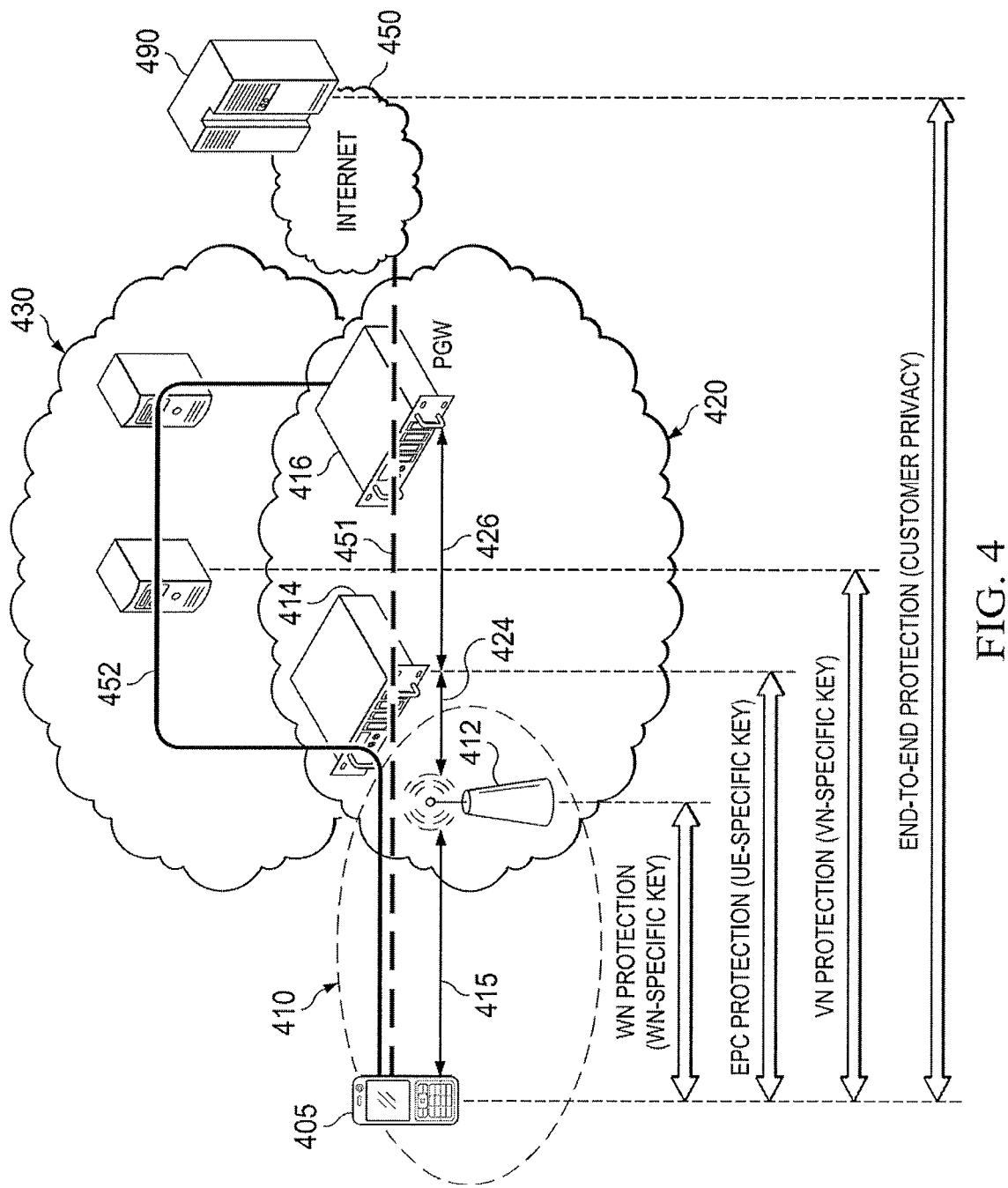
FIG. 4 illustrates a diagram of an embodiment wireless network architecture for providing multi-level access protection.

FIG. 4 illustrates an embodiment wireless network architecture 400 for providing multi-level access protection. As shown, the embodiment wireless network architecture 400 comprises a radio access network 410, an evolved packet core (EPC) 420, and a virtual network 430. The RAN 410 includes an access point 412 adapted to provide wireless access to a UE 405. The EPC 420 includes, inter alia, a gateway, such as serving gateway (SGW) 414, that is adapted to serve as a gateway between the EPC 420 and the RAN 410, as well as a packet data network (PDN) gateway (PGW) 416 adapted to serve as a gateway between the EPC 420 and the interne 450. The EPC 420 may include other components (not depicted in FIG. 4), such as a mobility management entity (MME), an Evolved Packet Data Gateway, and a Home Subscriber Server (HSS). In next-generation networks, the EPC 420 may be broken into multiple distributed EPCs, in which case some components (e.g., SGWs) may be positioned in the distributed EPCs.

Notably, the RAN 410 and the EPC 420 collectively form a wireless network that provides a bearer path 451 between the UE 405 and the internet 450. The bearer path 451 may carry a traffic flow communicated between the UE 405 and a remote end 490, and may include multiple interfaces and/or segments. In this example, the bearer path 451 includes a wireless connection 415 (e.g., a "UU interface") extending between the UE 405 and the access point 412, a bearer channel 424 (e.g., an "S1-U interface") extending between the access point 412 to the SGW 414, and a bearer channel 426 (e.g., an "S5 interface") extending between the SGW 414 and the PGW 416. In some embodiments, the physical topology of the wireless network formed by the RAN 410 and EPC 420 may be mapped to a virtual topology using the virtual network 430. In such embodiments, the bearer path 451 may correspond to a virtual path 452 extending through the virtual network 430.

As shown, the embodiment wireless network architecture 400 provides multi-level access protection along the bearer path 451. Specifically, a WN-specific key is adapted to provide access protection over the wireless connection 415, while a UE-specific key is adapted to provide access protection over the bearer channel 424 and/or the bearer channel 426. In some embodiments, end-to-end protection may also be provided using customer privacy information. Additionally, virtual network protection may be provided using virtual network specific (VN-specific) key materials, or VN-specific keys (for short). While the wireless network architecture 400 is depicted as providing multiple levels of access protection, aspect of this disclosure is not so limited. For example, the wireless network 400 may be adapted to provide a single level of access protection by using the WN-specific keys to encrypt/decrypt data communicated over the wireless connection 415, e.g., without using the UE-specific key information. This may provide more efficient handovers, as the handover could take place without any keys being exchanged.

Figure 5:
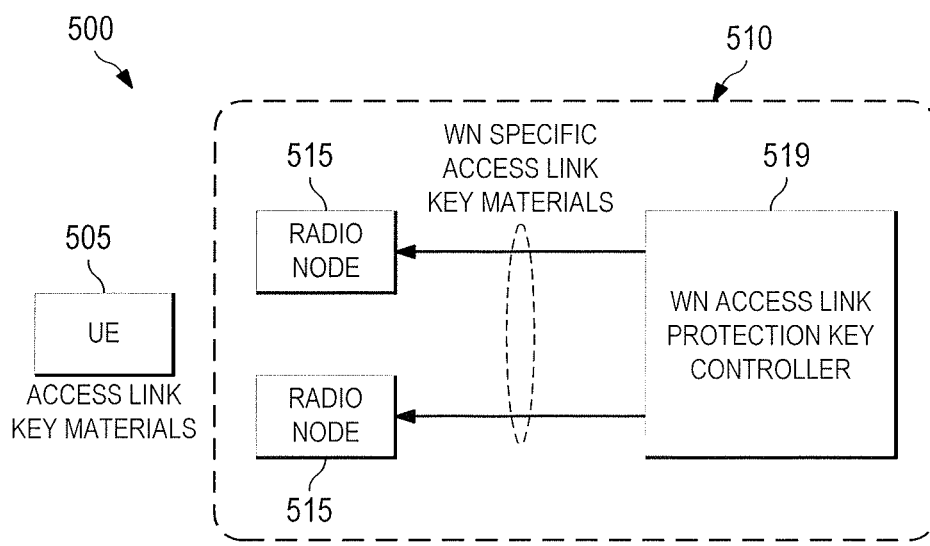
FIG. 5 illustrates a diagram of an embodiment wireless network security architecture for managing network access keys.

FIG. 5 illustrates an embodiment wireless network security architecture 500 for managing network access keys in a wireless network domain 510. As shown, the wireless network domain 510 comprises a plurality of radio nodes 515 and a wireless network access link protection key controller 519, or WN key controller 519 (for short). The WN key controller 519 sends a WN-specific key to local radio nodes 515. The radio nodes 515 distribute the WN-specific key to the UE 505 following UE authentication, after which time the WN-specific key is used to encrypt/decrypt data communicated over the radio access link. In an embodiment, the WN-specific key is synchronized across radio nodes 515 such that the UE 505 can be handed over between the radio nodes 515 without transferring the WN-specific key during the handover. The radio nodes 515 may be administrated by the same network operator.

Figure 6:
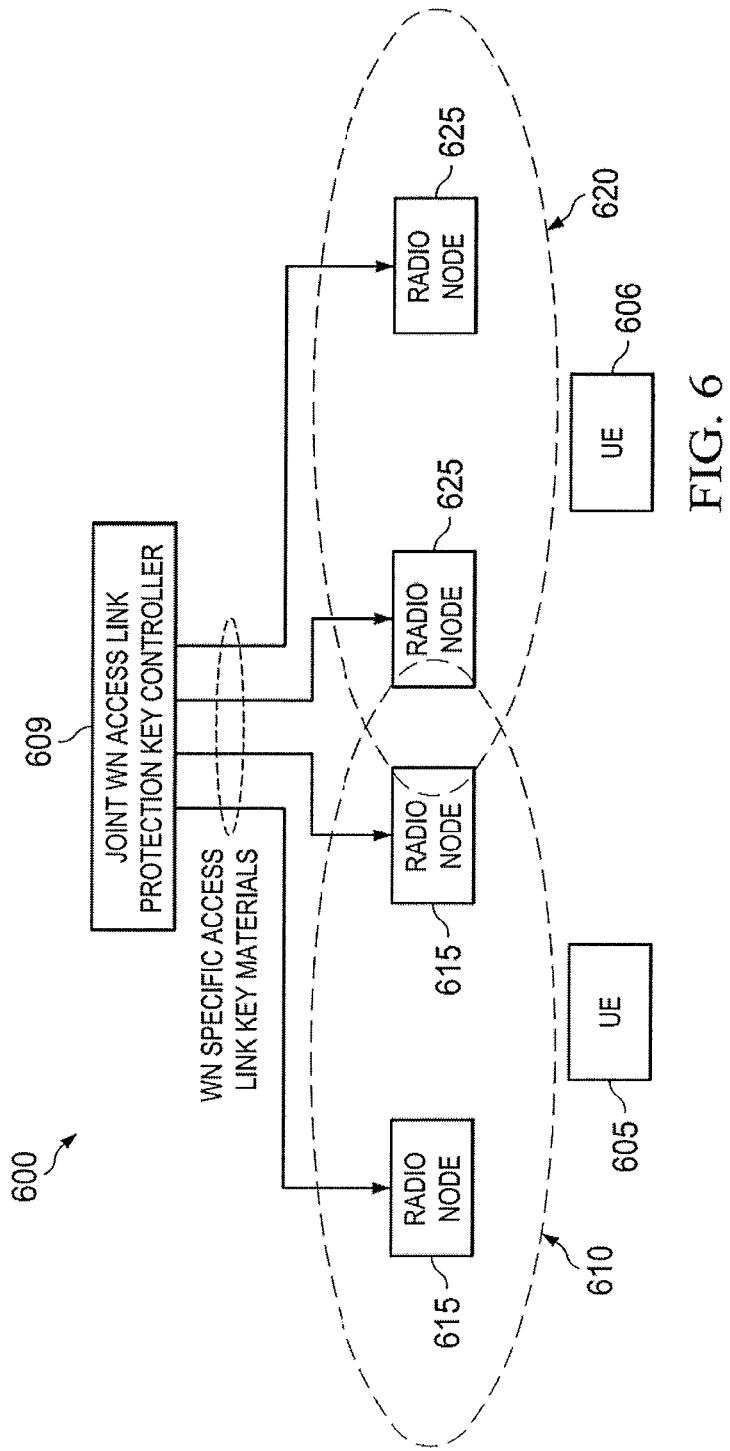
FIG. 6 illustrates a diagram of another embodiment wireless network security architecture for managing network access keys.

FIG. 6 illustrates an embodiment wireless network security architecture 600 for managing network access keys across multiple wireless network domains 610, 620. The wireless network domains 610, 620 may be administrated by the same operator, or by different operators, and may include radio nodes 615, 625 adapted to provide wireless access to the UEs 605, 606. The key controller 609 distributes a WN-specific key to the radio nodes 615, 625 prior to establishment of the wireless connection. The radio nodes 615, 625 distribute the WN-specific key to the UEs, 605, 606 following UE authentication. The WN-specific key is shared between the wireless network domains 610, 620 such that inter-domain handovers can be performed without transferring the WN-specific key during the handover.

Figure 7:
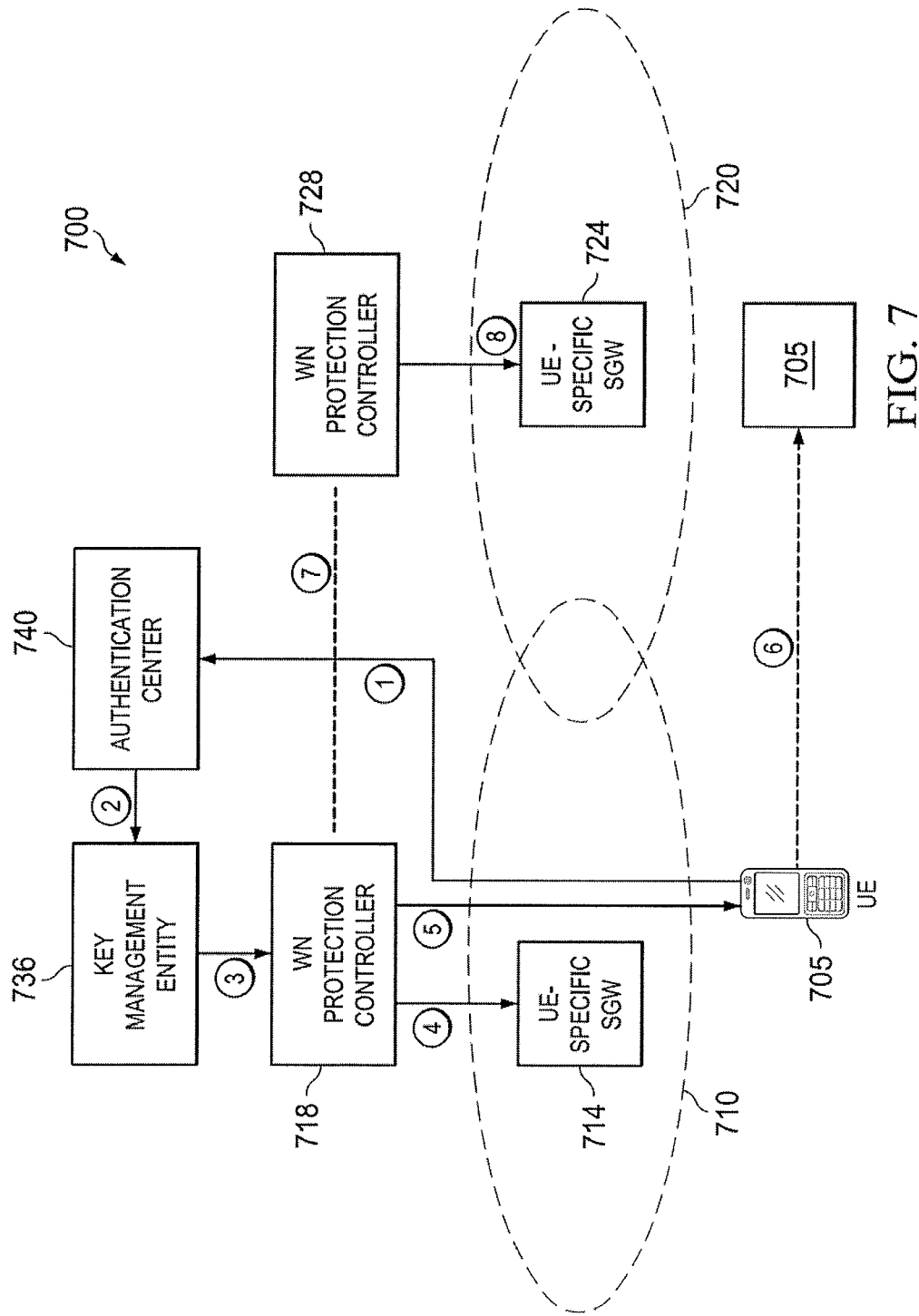
FIG. 7 illustrates a diagram of an embodiment wireless network architecture for managing UE-specific key materials.

Aspects of this disclosure provide security architectures for managing UE-specific keys. FIG. 7 illustrates an embodiment wireless network architecture 700 for managing UE-specific key materials between wireless network domains 710, 720. As shown, the network architecture 700 comprises UE-specific SGWs 714, 724 located in the respective wireless network domains 710, 720, WN protection controllers 718, 728 associated with the respective wireless network domains 710, 720, a key management entity 736, and an authentication center 740.

The management of UE-specific key materials in the wireless network architecture 700 is described as a sequence of eight steps, which may be triggered when the UE 705 initiates a link establishment procedure. In the first step (1), the UE 705 is authorized and authenticated by the authentication center 740. In some embodiments, the authentication center 730 comprises a global entity responsible for various UE-specific tasks, e.g., a UE-specific name, authentication, authorization, and/or charging server, etc. In other embodiments, the authentication center 730 comprises a control center in a home network of the UE 705.

During the second step (2), the authentication center 740 provides a UE-specific key, or materials for deriving the UE-specific key, to the key management entity 736. The key management entity then provides the UE-specific key to the WN protection controller 718 during the third step (3). The WN protection controller 718 distributes the UE-specific keys to the UE-specific SGW 714 during the fourth step (4), and to the UE 705 during the fifth step (5).

During the sixth step, the UE 705 is moves from from the wireless network domain 710 to the wireless network domain 720, thus triggering a handover. As a result of the handover, the UE-specific key is transferred from the WN protection controller 710 to the WN protection controller 728 during the seventh step (7). WN protection controller 728 is responsible for the key distribution in the second wireless domain 720, and distributes the UE-specific key to the UE-specific SGW during the eighth step (8).

Figure 8:
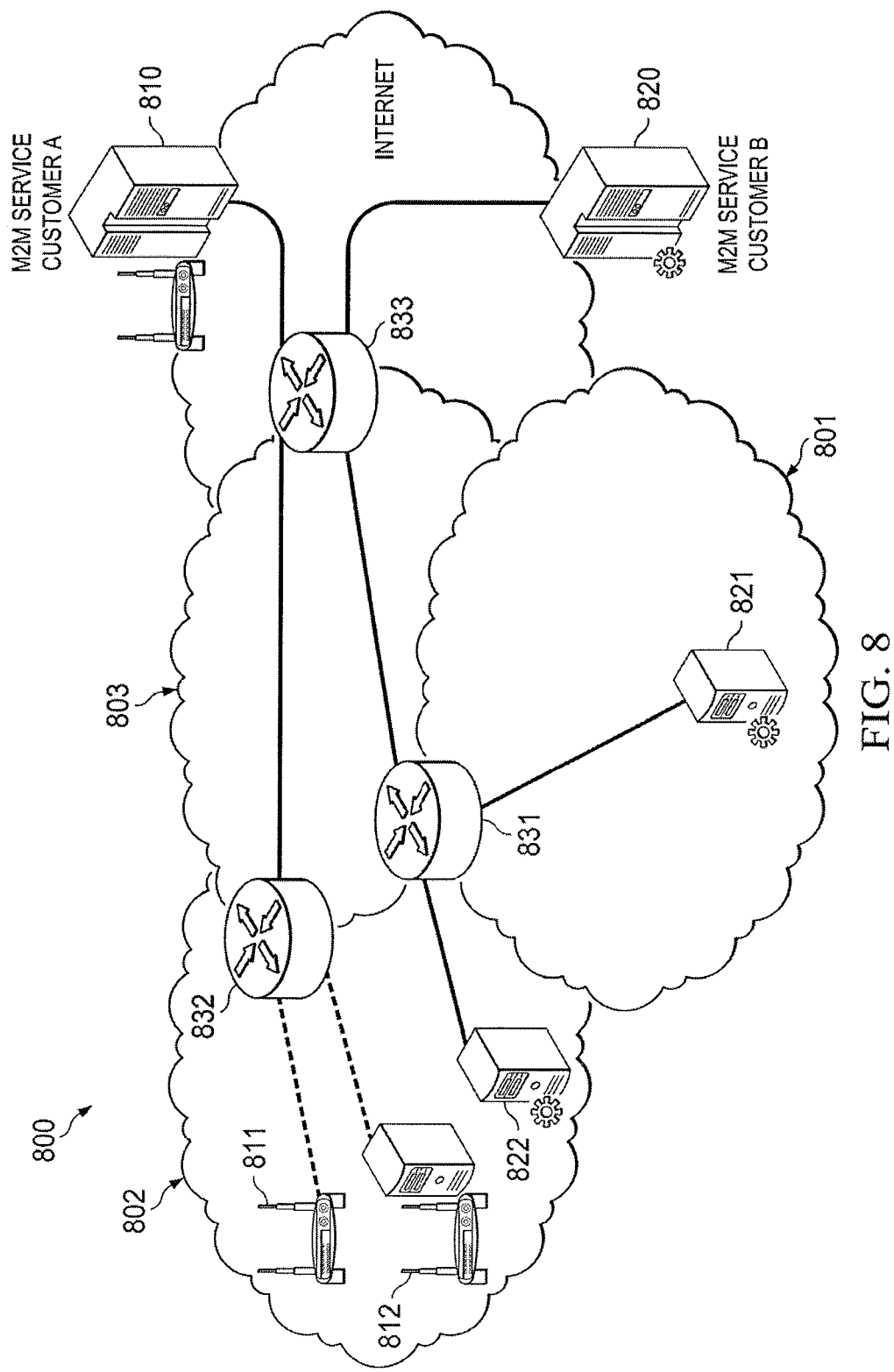
FIG. 8 illustrates a diagram of an embodiment network architecture for providing access protection to M2M services.

Aspects of this disclosure provide service-specific keys adapted to provide access protection for traffic relating to machine-to-machine (M2M) services. FIG. 8 illustrates an embodiment network architecture 800 for providing access protection to traffic related to M2M services transported over a plurality of network domains 801, 802, 803. In this example, a first M2M service registered to the M2M customer 810, and a second M2M service is registered to the M2M customer 820. The M2M related traffic may be encrypted/decrypted using service-specific key information. For example, the machines 811, 812 may encrypt data using a first service-specific key prior to communicating the traffic to the M2M service customer 810, while the machines 821, 822 may encrypt data using a second service-specific key prior to communicating the traffic to the M2M service customer 820.

The M2M service related traffic may be filtered at various network locations. For example, networks that have relatively stable topologies (e.g., do not frequently add/remove machines) may perform traffic filtering at the network edge, e.g., at the respective machines and M2M customers. Other networks may filter M2M service related traffic at one of the gateways 831-833 in the network domains 801-803. For example, filtering may be performed at service-specific gateway, e.g., a virtual service-specific SGW, etc. Filtering may also be performed by a PGW, or by a gateway in a virtual network domain. The entity that performs filtering on the M2M related traffic may attempt to decrypt packets in the traffic flow using the corresponding service-specific key, and then drop any packet that the entity is unable to successfully decrypt.

Figure 9:
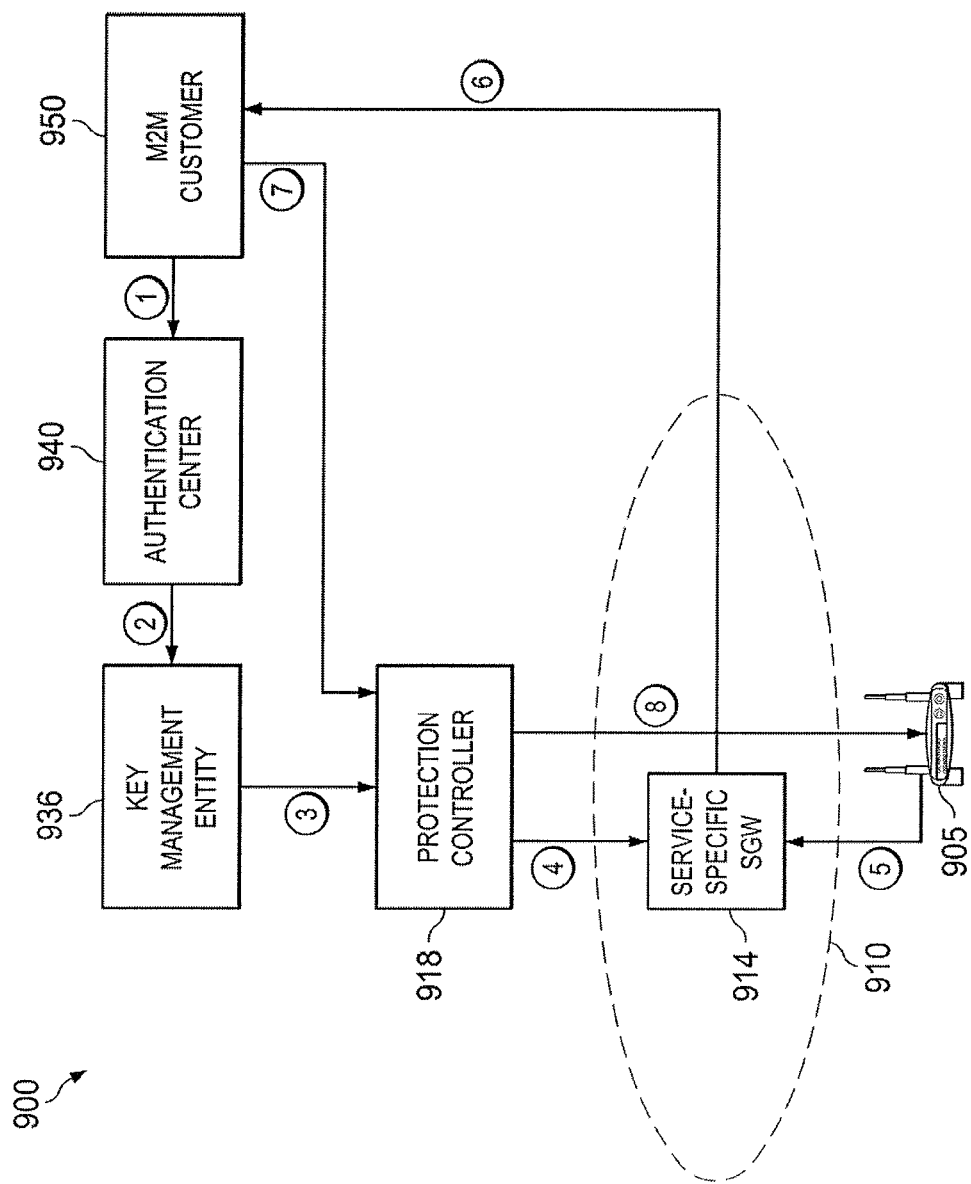
FIG. 9 illustrates a diagram of an embodiment wireless network architecture for managing UE-specific key materials.

Aspects of this disclosure provide architectures for managing service-specific key materials. FIG. 9 illustrates an embodiment wireless network architecture 900 for managing service-specific key materials in a network domain 910. As shown, the network architecture 900 comprises a service-specific SGW 914 located in a network domain 910, a protection controller 918 associated with the network domain 910, a key management entity 936, an authentication center 940, and an M2M customer 950.

The management of service-specific key materials in the wireless network architecture 900 is described as a sequence of eight steps, which may be triggered when an M2M service registration is initiated by the M2M customer 950. In the first step (1), the M2M customer 950 is authorized and authenticated by the authentication center 940, which may be a global entity responsible for various M2M service-specific tasks or a control center in a home network of the M2M customer 950.

During the second step (2), the authentication center 940 provides a service-specific key, or materials for deriving the service-specific key, to the key management entity 936. The key management entity then provides the service-specific key to the protection controller 918 during the third step (3), and the protection controller 918 distributes the service-specific keys to the service-specific SGW 914 during the fourth step (4). During the fifth step (5), the machine 905 attempts to register as a participant in the M2M service, which may include sending a request specifying a service name to the service-specific SGW 914. The registration attempt may be triggered when the machine 905 is powered-on or otherwise configured by a user. During the sixth step (6), the service request is forwarded from the service-specific SGW 914 to the M2M customer 950, which may maintain security information for authenticating devices/machines permitted participate in the M2M service. During step seven (7), the M2M customer 950 informs the protection controller 918 that the machine 905 has been authenticated, which prompts the protection controller 918 to distribute the service-specific key to the machine 905 during the eighth step (8).

Figure 10:
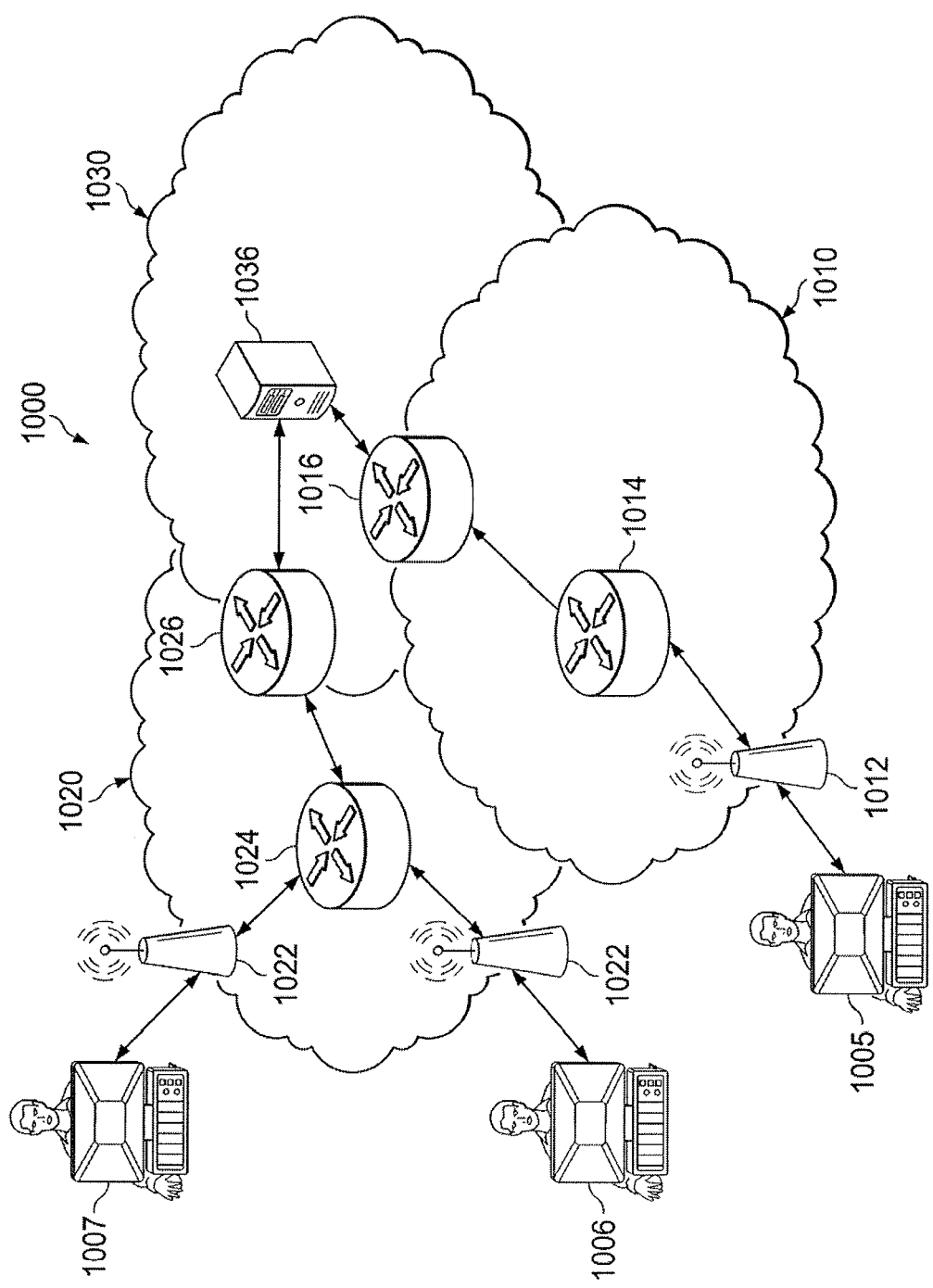
FIG. 10 illustrates a diagram of an embodiment network architecture for providing access protection for communications between members of a common group.

Aspects of this disclosure use group-specific keys to provide access protection for traffic communicated between members of a private network. FIG. 10 illustrates an embodiment network architecture 1000 for providing access protection to traffic communicated between members of a common group, e.g., a private social network. As shown, the embodiment network architecture 1000 comprises wireless network domains 1010, 1020 for providing wireless access to wireless devices 1005, 1006, 1007 registered to a common network or group, e.g., a private social network/group. As shown, the wireless network domains 1010, 1020 include access points 1012, 1022 adapted to provide wireless access to the wireless devices 1005, 1006, 1007, as well as serving gateways 1014, 1024, and packet gateways 1016, 1026. In some embodiments, the group-related traffic is transported to a remote end 1036 (e.g., applications server, etc.) via the internet 1030. The group-related traffic may also be communicated between the group members 1005, 1006, 1007. Group-specific keys may be used to encrypt/decrypt the group-related traffic by members 1005, 1006, 1007, as well as by the remote end 1036.

Figure 11:
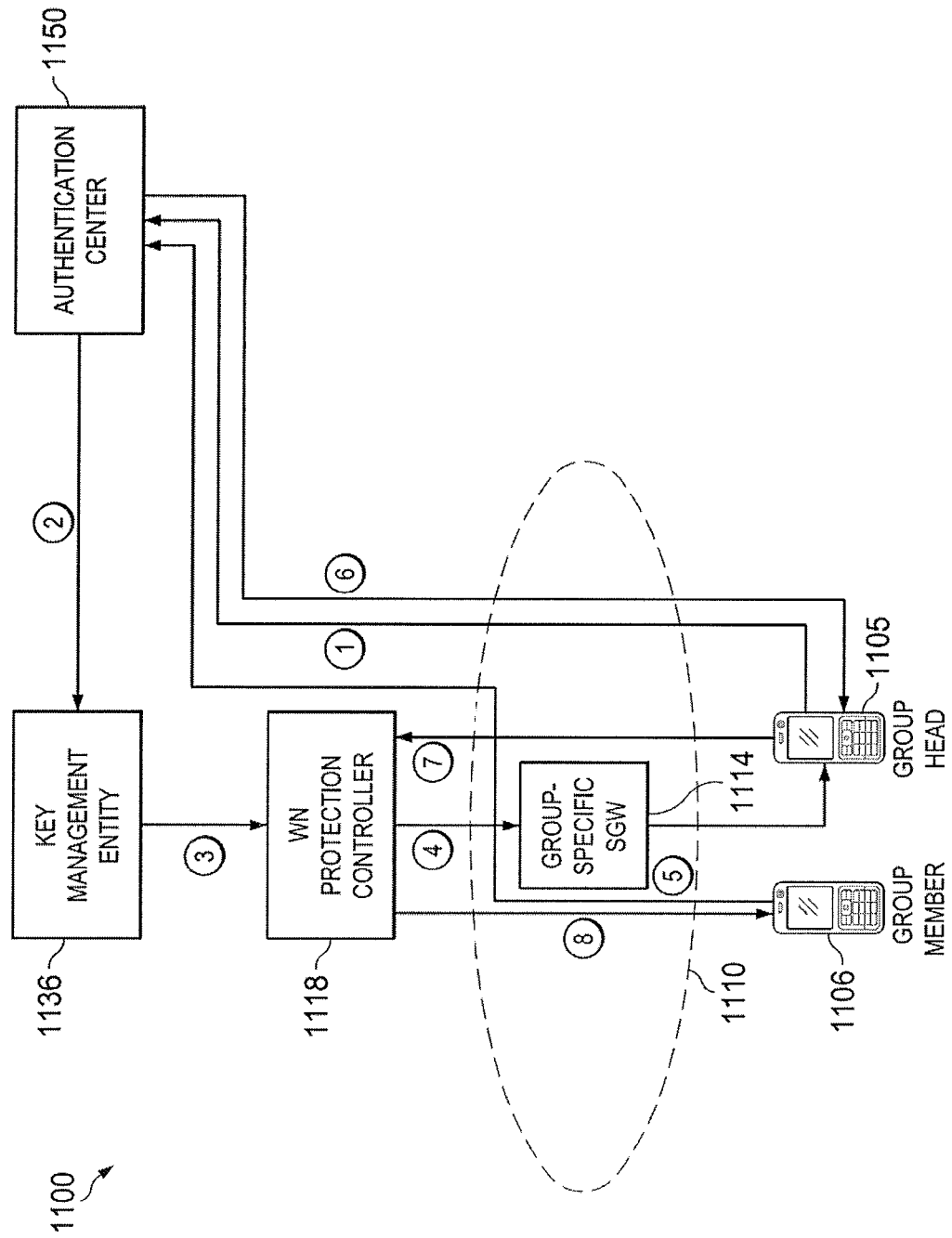
FIG. 11 illustrates a diagram of an embodiment wireless network architecture for managing group-specific key materials.

FIG. 11 illustrates an embodiment wireless network architecture 1100 for managing group-specific key materials in a network domain 1110. As shown, the network architecture 1100 comprises a group-specific SGW 1114 located in a network domain 1110, a protection controller 1118 associated with the network domain 1110, a key management entity 1136, and an authentication center 1150. The management of group-specific key materials in the wireless network architecture 1100 is described as a sequence of eight steps, which may be triggered when a private group/network registration is initiated by a group head device 1105.

In the first step (1), the head device 1105 is authorized and authenticated by the authentication center 1150. The authentication center 1150 may be a global entity responsible for various group-specific tasks or a control center in a home network of the head device 1105. In the second step (2), the key management entity 1136 creates a group-specific key. The key management entity 1136 then sends the group-specific key to the WN protection controller 1118 in the third step (3), and the WN protection controller 1118 sends the group-specific key to the group-specific SGW 1114 during the fourth step (4). During the fifth step (5), a group member 1106 attempts to register as a participant in the private network by sending a registration request to the authentication center 1150. In the sixth step, the authentication center 1150 forwards the request to the head device 1105, which sends an authentication confirmation to the WN protection controller 1118 in the seventh step. In the eighth step (8), the WN protection controller 1118 sends the group-specific key to the group member 1106, after which the group-specific key is used to encrypt/decrypt group-related traffic.

Aspects of this disclosure provide several benefits. For example, embodiment techniques may provide flexible protection schemes for wireless network access, and reduce the amount of link protection materials transferred during handovers. Embodiments may also provide unified security control and provide security control convergence at the virtual user-specific SGW, virtual service-specific SGW, and/or virtual group-specific SGW. Aspects of this disclosure may provide access protection to wireless backhaul links, as well as prevent malicious nodes from attacking customer traffic. In an embodiment, nodes within a wireless network domain may use a backhaul (BH) key to encrypt/decrypt communications over wireless backhaul interfaces. Management of different types of keys may be independent from one another.

Encryption/decryption using the various keys (e.g., UE-specific key, WN-specific key, etc.) may be used in any direction over the corresponding link, interface, or channel. For example, the WN-specific key can be used to perform encryption/decryption of uplink data communicated over the radio access link, as well as to perform encryption/decryption of downlink data communicated over the radio access link.

Aspects of this disclosure provide a method for wireless network access protection. The method comprises obtaining a wireless network (WN) specific key assigned to a wireless network, establishing a radio interface between a base station and a user equipment (UE), and receiving encrypted data from the UE over the radio interface. The encrypted data has at least a first layer of encryption and a second layer of encryption. The method further includes partially decrypting the encrypted data using the WN specific key to remove the first layer of encryption from the encrypted data, thereby obtaining partially decrypted data that includes the second layer of encryption, and forwarding the partially decrypted data to a gateway in the WN. In some embodiments, the gateway comprises a user-specific serving gateway (SGW). In some embodiments, the user-specific SGW is adapted to further decrypt the partially decrypted data using a UE-specific key to remove the second layer of encryption from the encrypted data. The UE-specific key may be different than the WN-specific key. In some embodiments, the user-specific SGW and the base station are co-located on the same network-side device. In other embodiments, the user-specific SGW and the base station are located on different network-side devices. In some embodiments, the method further includes receiving a packet over the radio interface, attempting to partially decrypt the packet using the WN specific key, dropping the packet when the attempt to partially decrypt the packet is unsuccessful. The method may further include forwarding the packet to the user-specific SGW when the attempt to partially decrypt the packet is successful. The user-specific SGW is adapted to attempt to further decrypt the packet using a UE-specific key, and to drop the packet when the attempt to further decrypt the packet using the UE-specific key is unsuccessful. In some embodiments, the first layer of encryption provides access protection to the radio interface, and the second layer of encryption provides access protection to a bearer channel extending between the UE and the user-specific SGW. In some embodiments, the WN specific key is distributed to a set of base stations in the wireless network such that handovers between base stations in the set of base stations may occur without exchanging the WN specific key during the handover. The WN specific key may be assigned to a group of wireless networks such that handovers between wireless networks in the group of wireless networks occur without exchanging the WN specific key during the handover. An apparatus for performing this method is also provided.

Aspects of this disclosure provide a method for distributing keys in wireless networks. In this example, the method comprises generating a wireless network (WN) specific key at a WN key controller. The WN specific key is assigned to a first wireless network. The method further includes distributing the WN specific key to base stations in the first wireless network to provide access protection over radio access interfaces established between the base stations and user equipments (UEs) accessing the wireless network. In some embodiments, the WN specific key is assigned to a group of wireless networks that includes at least the first wireless network and a second wireless network. In such embodiments, the method further includes distributing the WN specific key to base stations in the second wireless network. In some embodiments, the method further comprises updating the WN specific key at the end of a first period, and distributing the updated WN specific key to base stations in the first wireless network at the beginning of a second period. The WN specific key provides access protection to the radio access interfaces during the first period, and wherein the updated WN specific key provides access protection to the radio access interfaces during the second period. An apparatus for performing this method is also provided. The WN specific key can be distributed to access points that a UE is not connected to, mitigating the need to include key information in a base station to base station handover process. At the same time, if UE traffic to a gateway is encrypted using a different key (e.g. a UE specific key), the UE traffic is still protected from intrusion until it is received by the gateway.

Aspects of this disclosure provide a key management architecture. In this example, the key management architecture includes a wireless network (WN) protection controller adapted to obtain user equipment (UE) specific keys assigned to the UEs accessing a wireless network, and to distribute the UE specific keys to a serving gateway (SGW) in the wireless network. The UE specific keys are adapted to provide access protection over bearer channels extending between the UE and the SGW. In some embodiments, the WN protection controller obtains the UE specific keys from a third party key management entity. The third party key management entity being operated by a third party administrator that is separate and distinct form an operator of the wireless network. In some embodiments, the key management architecture also includes a WN key controller adapted to generate a WN specific key assigned to the wireless network, and to distribute the WN specific key to base stations in the wireless network. The WN specific key may be separate and distinct from the UE specific keys. The WN specific key is adapted to provide access protection over radio access interfaces established between the base stations and user equipments (UEs) accessing the wireless network.

Aspects of this disclosure provide a method for authenticating a mobile device. In this example, the method includes receiving a UE specific key from a third party key management entity at a WN protection controller assigned to distribute keys throughout a wireless network. The third party key management entity is operated by a third party administrator that is different than an operator of the wireless network. The method further includes identifying a wireless network domain that corresponds to a UE identifier specified by the UE specific key, and distributing the UE specific key to a serving gateway (SGW) in the wireless network domain. The UE specific key is adapted to provide access protection to a bearer channel extending between the UE and the SGW. In some embodiments, the SGW is a user-specific SGW. An apparatus for performing this method is also provided.

Aspects of this disclosure provide a method for providing service specific access protection. In this example, the method includes identifying a machine-to-machine (M2M) service associated with an M2M customer, receiving a service-specific key assigned to the M2M service at an SGW, and receiving a packet from a network device. The packet is related to the M2M service. The method further includes attempting to decrypt the packet using the service-specific key, and dropping the packet when the attempt to decrypt the packet is unsuccessful. In some embodiments, the SGW is a service-specific SGW. In some embodiments, the method further comprises forwarding the decrypted packet to the M2M customer when the attempt to decrypt the packet is successful. In some embodiments, the service-specific key is assigned to the M2M service, and is not specific to the network device. In some embodiments, the service-specific key is provided to the network device after the M2M customer authenticates the network device. An apparatus for performing this method is also provided.

Aspects of this disclosure provide a method for group specific access protection. In this example, method comprises identifying a private network, receiving a group-specific key assigned to the private network at an SGW, receiving a packet addressed to a network device belonging to the private network, and attempting to decrypt the packet using the group-specific key. The method further comprises dropping the packet when the attempt to decrypt the packet is unsuccessful. In some embodiments, the SGW is a service-specific SGW. In some embodiments, the common group comprises to a private social network. In some embodiments, the key is assigned to the private network, and is not specific to any one of the individual network devices. An apparatus for performing this method is also provided.

Figure 12:
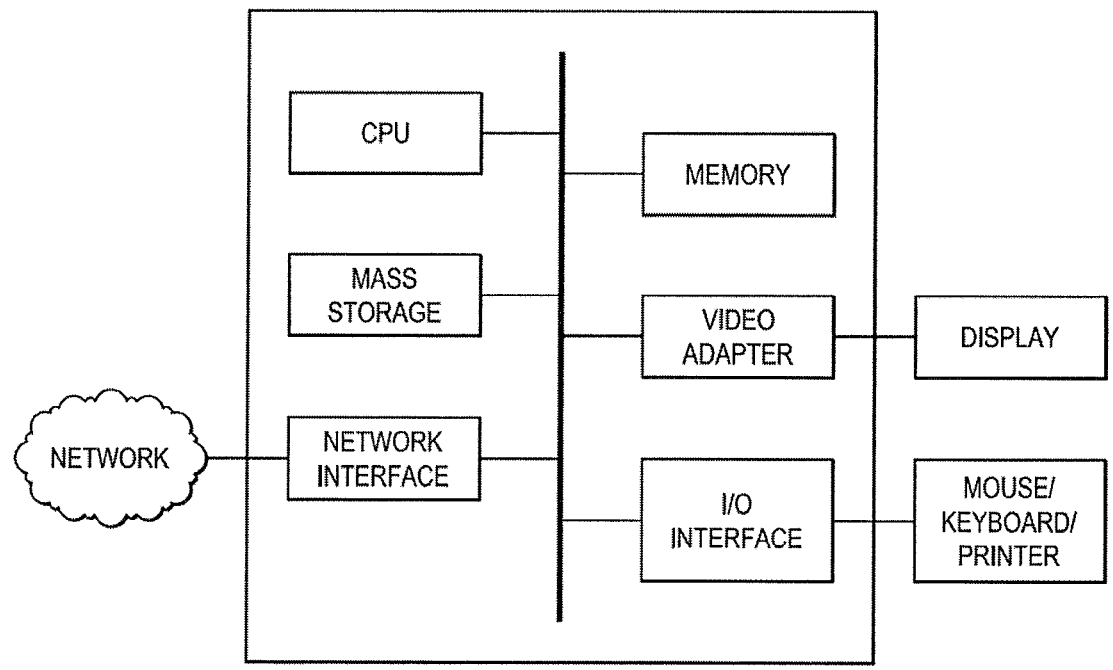
FIG. 12 illustrates a diagram of an embodiment computing platform.

FIG. 12 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of non-transitory storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 13:
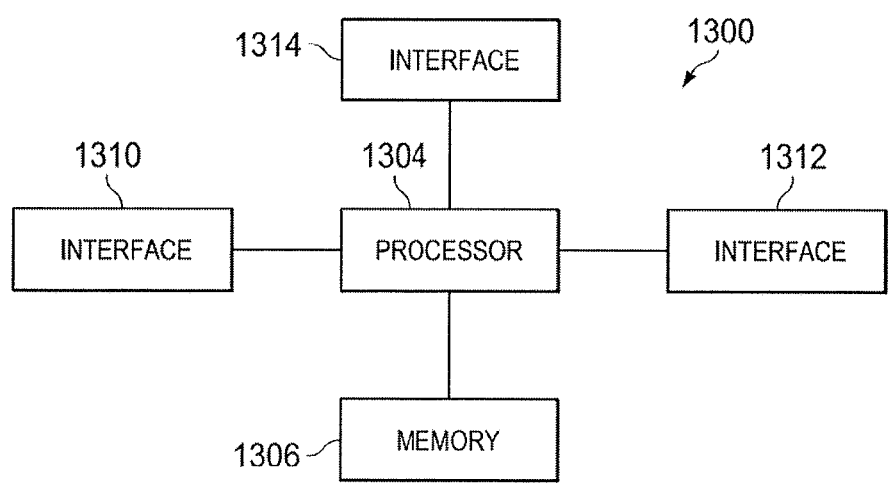
FIG. 13 illustrates a diagram of an embodiment communications device.

FIG. 13 illustrates a block diagram of an embodiment of a communications device 1300, which may be equivalent to one or more devices (e.g., UEs, eNBs, controllers, etc.) discussed above. The communications device 1300 may include a processor 1304, a memory 1306, and a plurality of interfaces 1310, 1312, 1314, which may (or may not) be arranged as shown in FIG. 13. The processor 1304 may be any component capable of performing computations and/or other processing related tasks, and the memory 1306 may be any component capable of storing programming and/or instructions for the processor 1304. The interfaces 1310, 1312, 1314 may be any component or collection of components that allow the communications device 1300 to communicate with other devices.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed:

1. A method comprising:
   obtaining, by an apparatus, at least two keys of a wireless network (WN)-specific key, a user equipment (UE)-specific key, or a virtual network (VN)-specific key assigned to a wireless network; and
   transmitting, by the apparatus to a base station in the wireless network, encrypted data using the at least two keys over a wireless connection between the base station and the apparatus,
   wherein the WN-specific key provides a first level access protection over wireless connection between the base station and the apparatus,
   wherein the UE-specific key provides a second level access protection over a bearer path to a gateway, the bearer path including a bearer channel between the base station and the gateway, and
   wherein the VN-specific key provides a third level access protection over a virtual path extending through a VN.

2. The method of claim 1, wherein the base station is between the apparatus and the gateway, and the gateway is one of a serving gateway (SGW), or a packet data network (PDN) gateway (PGW) in an evolved packet core (EPC).

3. The method of claim 1, wherein the bearer path corresponds to the virtual path in the VN mapped from the wireless network.

4. The method of claim 1, wherein the apparatus is authorized and authenticated by a global authentication center, the global authentication center being independent from an operator of the wireless network.

5. The method of claim 4, wherein the obtaining comprises:
   obtaining, by the apparatus, the UE-specific key from a WN protection controller in the wireless network, wherein the WN protection controller provides the UE-specific key to the gateway.

6. The method of claim 5, further comprising:
   moving, by the apparatus, from a coverage area of the wireless network to a second coverage area of a second wireless network,
   wherein the UE-specific key is transferred from the WN protection controller in the wireless network to a second WN protection controller in the second wireless network, and
   wherein the second WN protection controller provides the UE-specific key to a second gateway in the second wireless network.

7. The method of claim 4, wherein the apparatus is a head apparatus of a group of apparatuses, the method further comprising:
   receiving, by the apparatus from a WN protection controller in the wireless network, a group-specific key after the apparatus is authorized and authenticated by the global authentication center, the group-specific key being used for encryption of group-related traffic in a private network.

8. The method of claim 7, further comprising:
   receiving, by the apparatus, a registration request sent by a second apparatus of the group of apparatuses, the registration request forwarded from the global authentication center to the apparatus, the registration request indicating that the second apparatus attempts to register as a participant of the private network; and
   sending, by the apparatus to the WN protection controller in the wireless network, an authentication confirmation, wherein the WN protection controller forwards the group-specific key to the second apparatus in response to the authentication confirmation.

9. An apparatus comprising:
   one or more hardware processors; and
   a non-transitory computer-readable storage medium storing programming for execution by the one or more hardware processors to perform operations, the operations comprising:
   obtaining at least two keys of a wireless network (WN)-specific key, a user equipment (UE)-specific key, or a virtual network (VN)-specific key assigned to a wireless network; and
   transmitting, to a base station in the wireless network, encrypted data using the at least two keys over a wireless connection between the base station and the apparatus, wherein the WN-specific key provides a first level access protection over wireless connection between the base station and the apparatus, wherein the UE-specific key provides a second level access protection over a bearer path to a gateway, the bearer path including a bearer channel between the base station and the gateway, and wherein the VN-specific key provides a third level access protection over a virtual path extending through a VN.

10. The apparatus of claim 9, wherein the base station is between the apparatus and the gateway, and the gateway is one of a serving gateway (SGW), or a packet data network (PDN) gateway (PGW) in an evolved packet core (EPC).

11. The apparatus of claim 9, wherein the bearer path corresponds to the virtual path in the VN mapped from the wireless network.

12. The apparatus of claim 9, wherein the apparatus is authorized and authenticated by a global authentication center, the global authentication center being independent from an operator of the wireless network.

13. The apparatus of claim 12, wherein the obtaining comprises:

obtaining the UE-specific key from a WN protection controller in the wireless network, wherein the WN protection controller provides the UE-specific key to the gateway.

14. The apparatus of claim 13, wherein the operations further comprise:

moving from a coverage area of the wireless network to a second coverage area of a second wireless network, wherein the UE-specific key is transferred from the WN protection controller in the wireless network to a second WN protection controller in the second wireless network, and wherein the second WN protection controller provides the UE-specific key to a second gateway in the second wireless network.

15. The apparatus of claim 12, wherein the apparatus is a head apparatus of a group of apparatuses, the operations further comprising:

receiving, by the apparatus from a WN protection controller in the wireless network, a group-specific key after the apparatus is authorized and authenticated by the global authentication center, the group-specific key being used for encryption of group-related traffic in a private network.

16. The apparatus of claim 15, wherein the operations further comprise:

receiving a registration request sent by a second apparatus of the group of apparatuses, the registration request forwarded from the global authentication center to the apparatus, and the registration request indicating that the second apparatus attempts to register as a participant of the private network; and sending, to the WN protection controller in the wireless network, an authentication confirmation, wherein the WN protection controller forwards the group-specific key to the second apparatus in response to the authentication confirmation.

17. A non-transitory computer-readable medium having instructions stored thereon that, when executed by an apparatus, cause the apparatus to perform operations, the operations comprising:

obtaining at least two keys of a wireless network (WN)-specific key, a user equipment (UE)-specific key, or a virtual network (VN)-specific key assigned to a wireless network; and transmitting, to a base station in the wireless network, encrypted data using the at least two keys over a wireless connection between the base station and the apparatus, wherein the WN-specific key provides a first level access protection over wireless connection between the base station and the apparatus, wherein the UE-specific key provides a second level access protection over a bearer path to a gateway, the bearer path including a bearer channel between the base station and the gateway, and wherein the VN-specific key provides a third level access protection over a virtual path extending through a VN.

18. The non-transitory computer-readable medium of claim 17, wherein the apparatus is authorized and authenticated by a global authentication center, the global authentication center being independent from an operator of the wireless network.

19. The non-transitory computer-readable medium of claim 18, wherein the obtaining comprises:

obtaining the UE-specific key from a WN protection controller in the wireless network, wherein the WN protection controller provides the UE-specific key to the gateway.

20. The non-transitory computer-readable medium of claim 18, wherein the apparatus is a head apparatus of a group of apparatuses, the operations further comprising:

receiving, from a WN protection controller in the wireless network, a group-specific key after the apparatus is authorized and authenticated by the global authentication center, the group-specific key being used for encryption of group-related traffic in a private network.

* * * * *